United States Patent
Lee et al.

(10) Patent No.: US 11,884,163 B2
(45) Date of Patent: Jan. 30, 2024

(54) APPARATUS FOR DETECTING OVERHEATING OF BATTERY MODULE AND METHOD THEREOF

(71) Applicants: Hyundai Motor Company, Seoul (KR); Kia Motors Corporation, Seoul (KR)

(72) Inventors: Yoon Jun Lee, Seoul (KR); Jong Hu Yoon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 264 days.

(21) Appl. No.: 17/020,295

(22) Filed: Sep. 14, 2020

(65) Prior Publication Data

US 2021/0354564 A1    Nov. 18, 2021

(30) Foreign Application Priority Data

May 15, 2020  (KR) .................. 10-2020-0058456

(51) Int. Cl.
*B60L 3/00*  (2019.01)
*B60L 58/18*  (2019.01)
*H01M 50/581*  (2021.01)
*H01M 10/48*  (2006.01)

(52) U.S. Cl.
CPC ............ *B60L 3/0046* (2013.01); *B60L 58/18* (2019.02); *H01M 10/482* (2013.01); *H01M 10/486* (2013.01); *H01M 50/581* (2021.01); *H01M 2200/103* (2013.01); *H01M 2220/20* (2013.01)

(58) Field of Classification Search
CPC .... B60L 3/0046; B60L 58/18; H01M 50/581; H01M 10/482; H01M 10/486; H01M 2200/103; H01M 2220/20
See application file for complete search history.

(56) References Cited

U.S. PATENT DOCUMENTS

| 9,413,031 | B2 | 8/2016 | Holung et al. | |
| 2010/0214707 | A1* | 8/2010 | Yun | H02J 7/0031 361/92 |
| 2012/0276423 | A1* | 11/2012 | Asakura | H01M 10/486 429/56 |
| 2021/0396595 | A1* | 12/2021 | Rat | G01K 7/16 |

FOREIGN PATENT DOCUMENTS

| CN | 106205029 A | * 12/2016 | ............ H01M 10/48 |
| CN | 106205029 A | 12/2016 | |
| CN | 111370784 A | * 7/2020 | |
| WO | WO-2015101465 A1 | * 7/2015 | .......... H01M 10/486 |

OTHER PUBLICATIONS

Machine translation of WO 2015101465, published Jul. 9, 2015. (Year: 2015).*

* cited by examiner

*Primary Examiner* — Brian R Ohara
*Assistant Examiner* — Emily Elizabeth Freeman
(74) *Attorney, Agent, or Firm* — Fox Rothschild LLP

(57) ABSTRACT

An apparatus for detecting overheating of a battery module includes a battery pack including a first battery module and a second battery module, a first temperature fuse arranged on the first battery module and having a first resistance value, a second temperature fuse arranged on the second battery module and having a second resistance value, and a controller that detects an overheated battery module based on a total resistance value of the first and second temperature fuses, which are connected in parallel to each other.

7 Claims, 5 Drawing Sheets

APPARATUS FOR DETECTING OVERHEATING OF BATTERY MODULE AND METHOD THEREOF

CROSS-REFERENCE TO RELATED APPLICATION

This application claims under 35 U.S.C. § 119(a) the benefit of Korean Patent Application No. 10-2020-0058456, filed in the Korean Intellectual Property Office on May 15, 2020, the entire contents of which are incorporated herein by reference.

BACKGROUND

(a) Technical Field

The present disclosure relates to a technique for detecting if at least one battery module of a battery pack is overheated.

(b) Description of the Related Art

A battery (e.g., a lithium polymer battery) that supplies power to an electric vehicle includes a cell, a module, and a pack. In this case, the module includes a plurality of cells, and the pack includes a plurality of modules. For example, the battery of the BMW i3® includes one pack including 96 cells, where one pack includes 8 modules, each of which includes 12 cells.

When such a battery is overheated, it is important to understand in advance whether the battery is overheated because it may lead to a fire in the electric vehicle that would potentially affect the safety of passengers.

In general, because a battery management system (BMS) mounted on an electric vehicle detects whether a battery pack is overheated by using a temperature sensor, the BMS cannot specifically determine which battery module has overheated in the battery pack.

Therefore, even though a first battery module is overheated, when a temperature measured by the temperature sensor is normal, a driver of the electric vehicle cannot be warned of the possibility of fire in advance. In particular, when a fire occurs in a battery, it is impossible to know which battery module caused the fire.

Although a scheme of providing a temperature sensor for each battery module has been considered, it is necessary to provide additional temperature sensors as the battery module increases in size, and additional connectors (or pins) must be provided on the printed circuit board (PCB) as the number of temperature sensors increases, so that it is difficult to commercialize the scheme.

The matters described in this background section are intended to promote an understanding of the background of the disclosure and may include matters that are not already known to those of ordinary skill in in the art.

SUMMARY

An aspect of the present disclosure provides an apparatus for detecting overheating of a battery module which includes a plurality of thermal fuses having different resistance values and is capable of detecting an overheated battery module based on a resistance value due to disconnection of at least one temperature fuse, where one thermal fuse is arranged on one battery module constituting one battery pack, and the thermal fuses are connected in parallel with each other, and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for detecting overheating of a battery module includes a battery pack including a first battery module and a second battery module, a first temperature fuse arranged on the first battery module and having a first resistance value, a second temperature fuse arranged on the second battery module and having a second resistance value, and a controller that detects an overheated battery module based on a total resistance value of the first and second temperature fuses, which are connected in parallel to each other.

The apparatus may further include a storage that stores a reference table in which a reference resistance value is recorded corresponding to disconnection of the first temperature fuse or the second temperature fuse.

The controller may measure the total resistance value of the first and second temperature fuses, search the reference table for a temperature fuse in which disconnection has occurred, based on the measured total resistance value, and determine that a battery module corresponding to the searched temperature fuse is overheated.

The apparatus may further include a third temperature fuse spaced apart from the first and second battery modules and having a third resistance value, wherein the third temperature fuse is connected in parallel with the first and second temperature fuses.

The controller may determine whether disconnection of the first and second temperature fuses was caused due to overheating or defective connector connections, based on the resistance value of the third temperature fuse when the disconnection occurred in the first and second temperature fuses.

The controller may warn of a possibility of fire when the overheated battery module is detected.

The controller may cut off power of the battery pack when the overheated battery module is detected.

The first and second temperature fuses may include wires that are melted at or above a threshold temperature, and wherein melting occurs throughout the wires.

The first temperature fuse may be arranged in a portion of the first battery module where a highest heat is generated.

The second temperature fuse may be arranged in a portion of the second battery module where a highest heat is generated.

According to another aspect of the present disclosure, a method of detecting overheating of a battery module includes arranging a first temperature fuse having a first resistance value on a first battery module constituting a battery pack, arranging a second temperature fuse having a second resistance value on a second battery module constituting the battery pack, connecting the first temperature fuse and the second temperature fuse in parallel with each other, and detecting an overheated battery module based on a total resistance value of the first and second temperature fuses.

The detecting of the overheated battery module may include storing a reference table in which a reference resistance value is recorded corresponding to disconnection of the first temperature fuse or the second temperature fuse, measuring the total resistance value of the first and second temperature fuses, searching the reference table for a temperature fuse in which disconnection has occurred, based on the measured total resistance value, and determining that a battery module corresponding to the searched temperature fuse is overheated.

The method may further include arranging a third temperature fuse having a third resistance value to be spaced apart from the first and second battery modules, connecting the third temperature fuse in parallel with the first and second temperature fuses, and determining whether disconnection of the first and second temperature fuses was caused due to overheating or defective connector connections, based on the resistance value of the third temperature fuse when the disconnection occurred in the first and second temperature fuses.

The method may further include warning of a possibility of fire when the overheated battery module is detected.

BRIEF DESCRIPTION OF THE DRAWINGS

The above and other objects, features and advantages of the present disclosure will be more apparent from the following detailed description taken in conjunction with the accompanying

DRAWINGS

Figure 1:
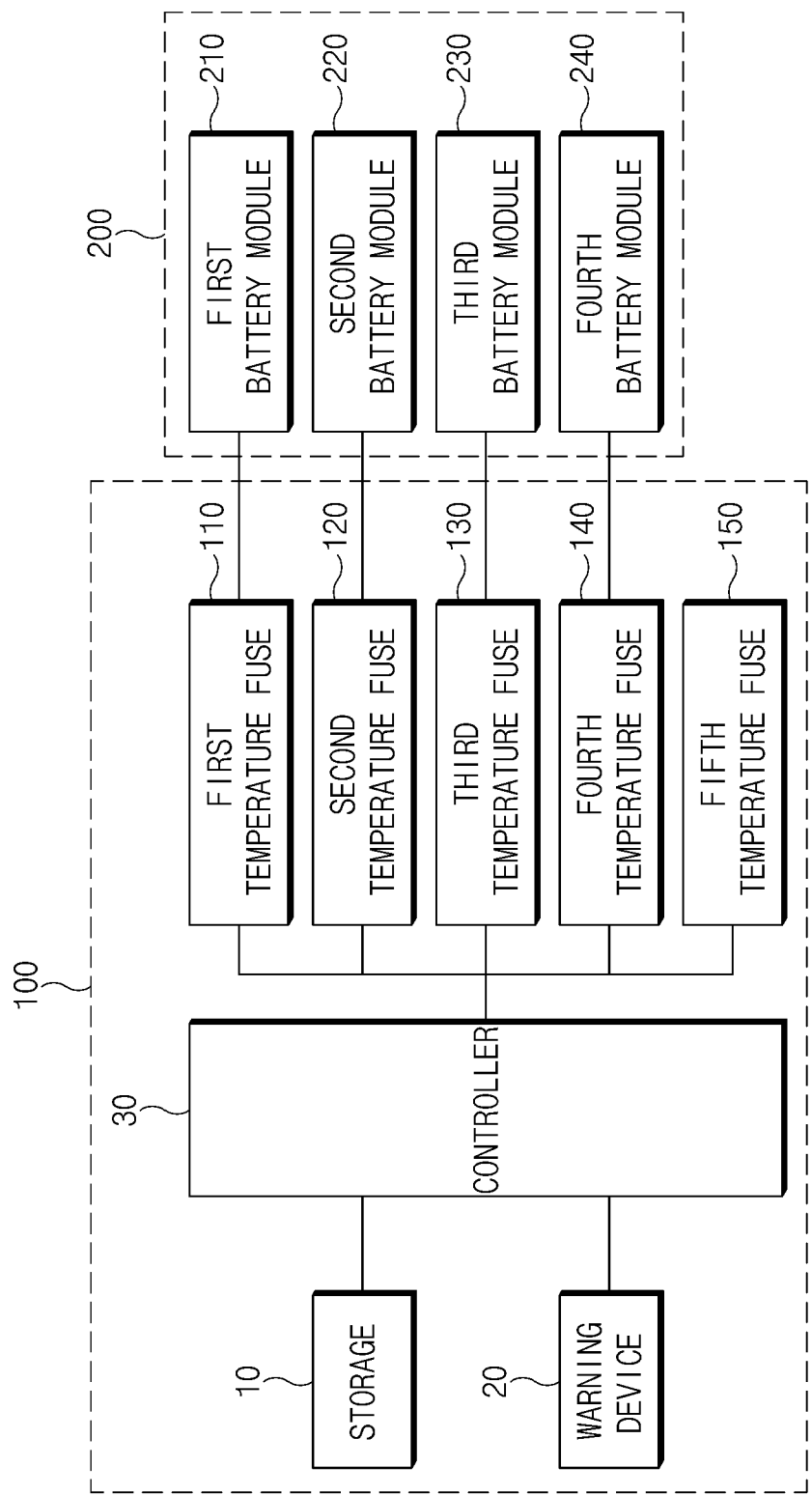
Figure 2:
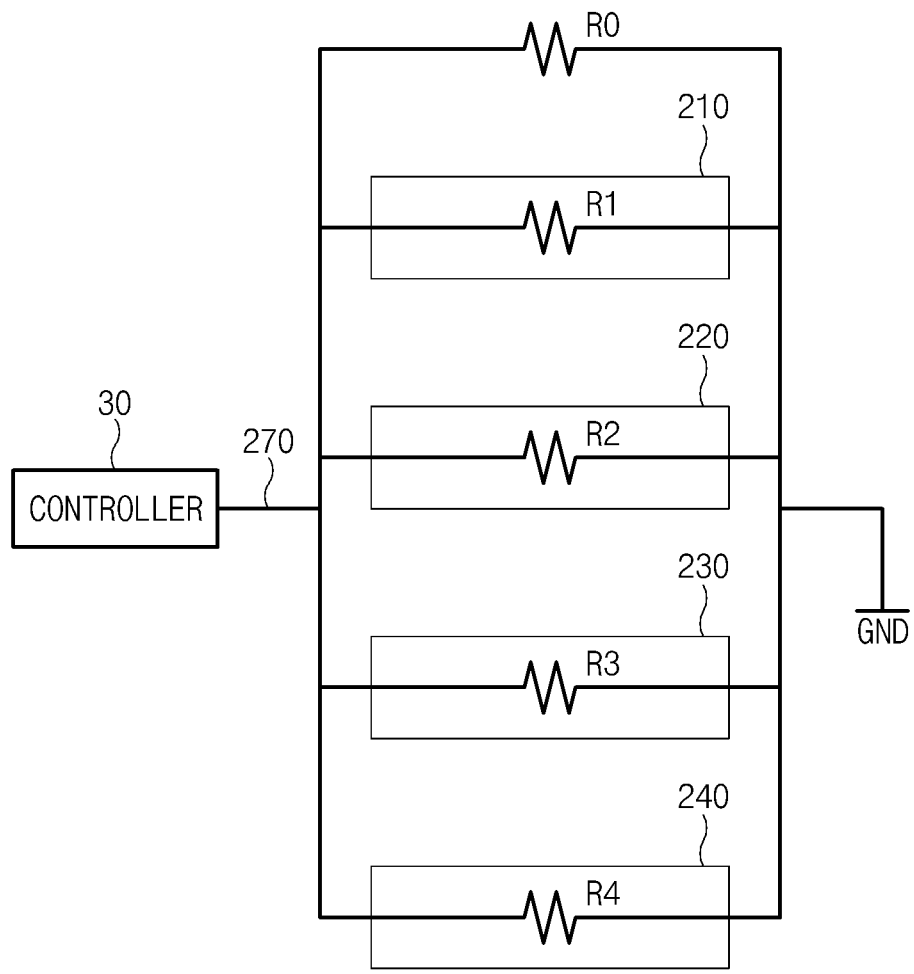
Figure 3:
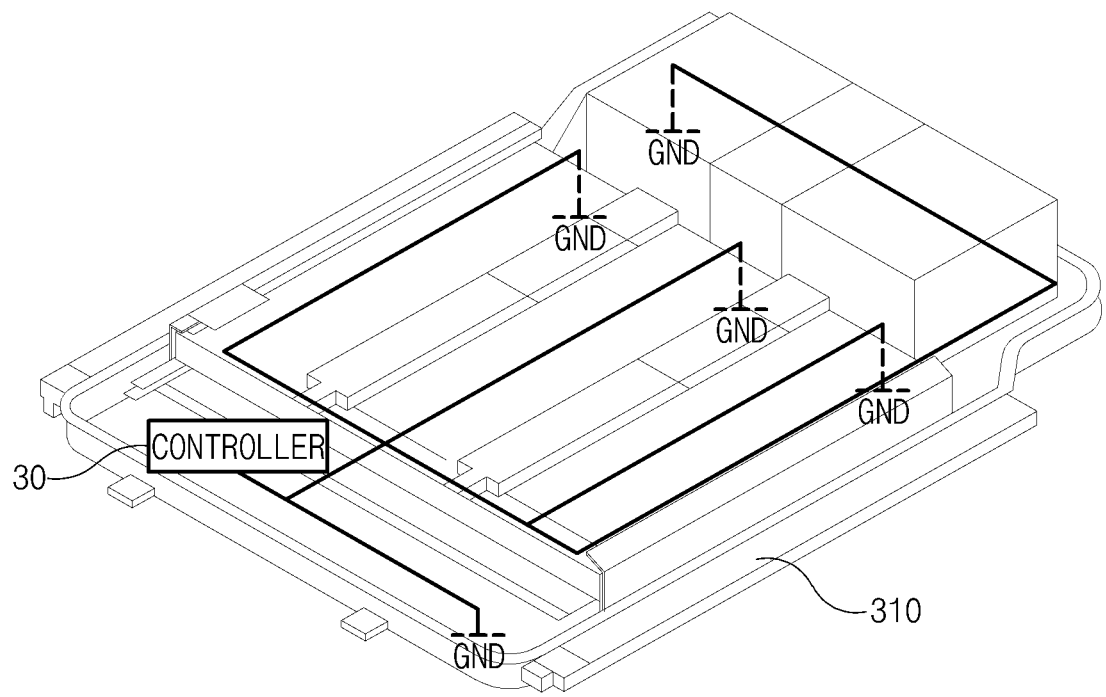
Figure 4:
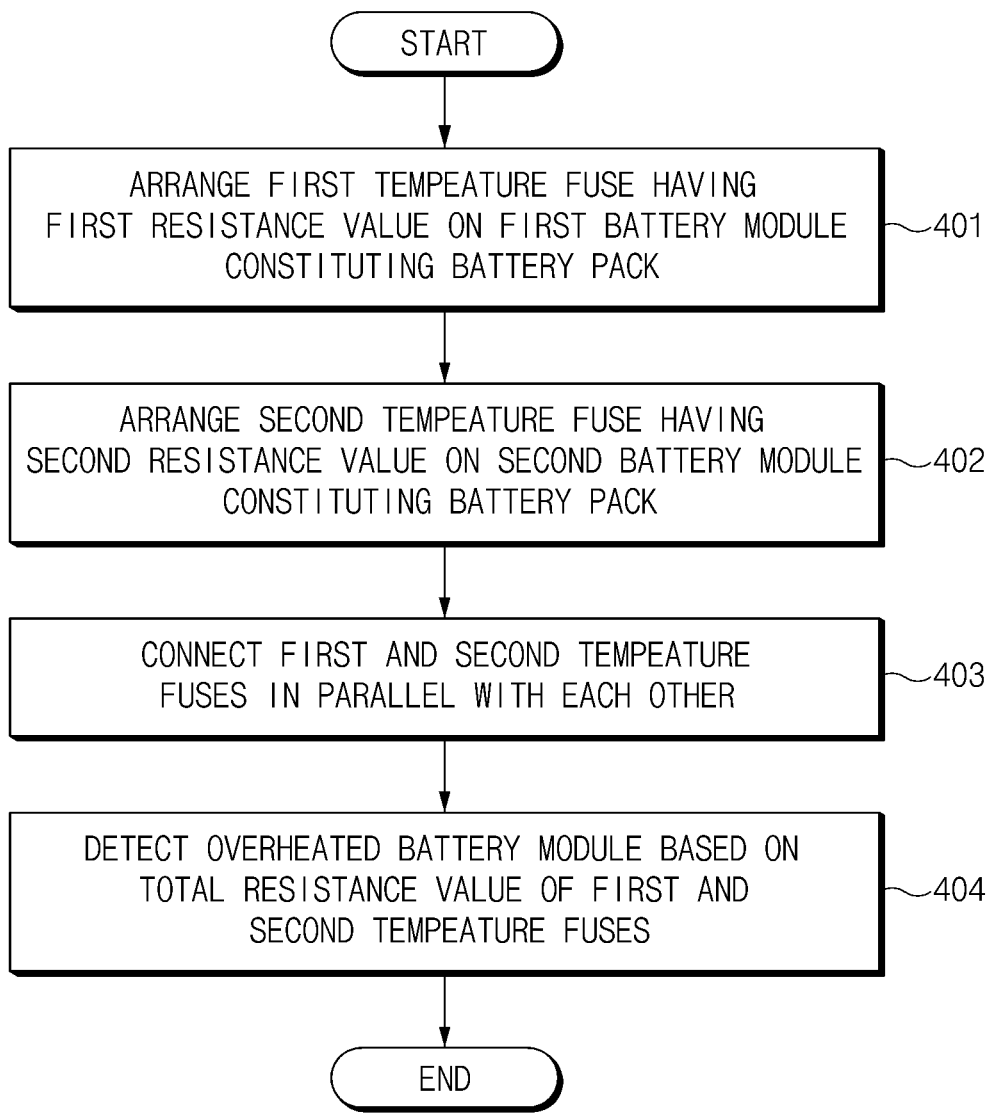
Figure 5:
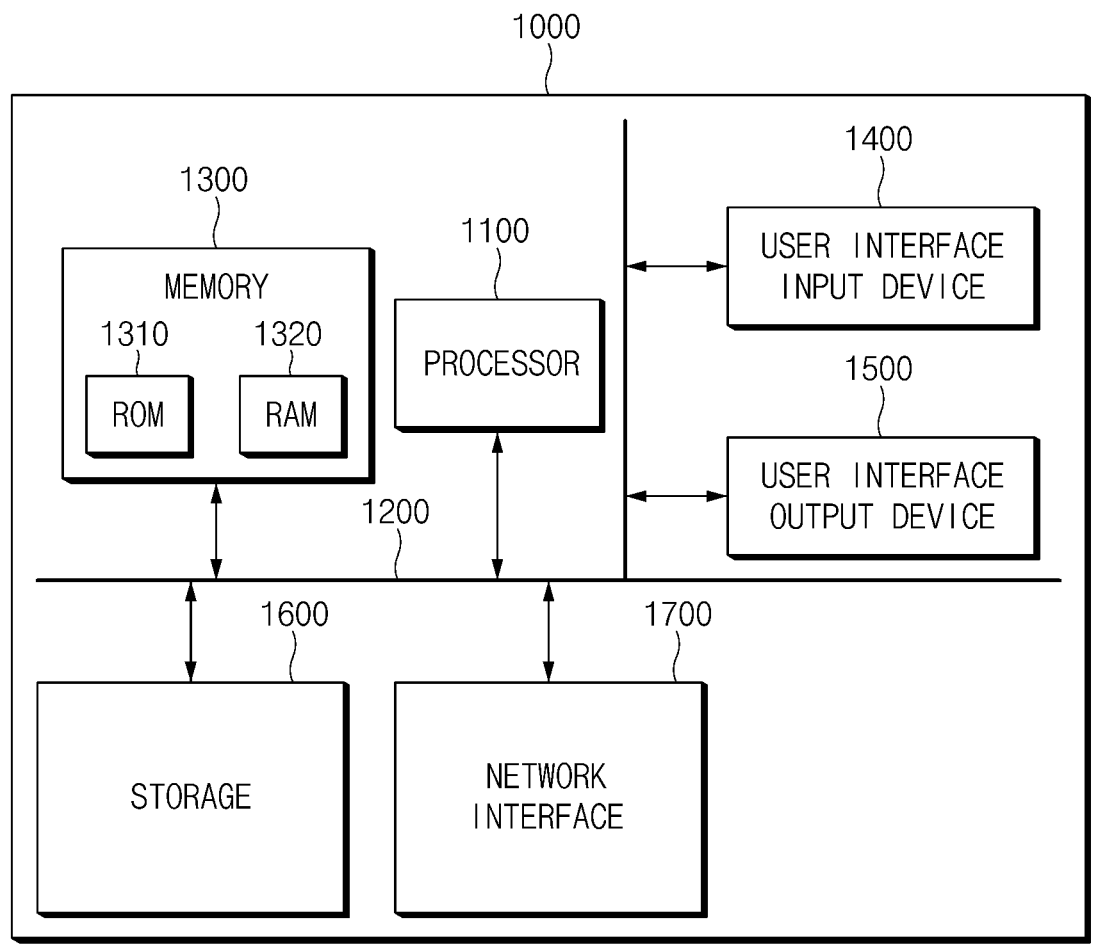

FIG. 1 is a block diagram of an apparatus for detecting overheating of a battery module according to an embodiment of the present disclosure;

FIG. 2 is a view illustrating a detailed structure of an apparatus for detecting overheating of a battery module according to an embodiment of the present disclosure;

FIG. 3 is a view illustrating a connection structure of a temperature fuse provided in an apparatus for detecting overheating of a battery module according to an embodiment of the present disclosure;

FIG. 4 is a flowchart illustrating a method of detecting overheating of a battery module according to an embodiment of the present disclosure; and FIG. 5 is a block diagram illustrating a computing system for executing a method of detecting overheating of a battery module according to an embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram of an apparatus for detecting overheating of a battery module according to an embodiment of the present disclosure. Although five temperature fuses are described as an example to help understanding, the number of temperature fuses can be changed according to the designer's intention, and even if the number of temperature fuses is changed, there is no difficulty in applying the present disclosure.

As shown in FIG. 1, an apparatus 100 for detecting overheating of a battery module according to an embodiment of the present disclosure may include a storage 10, a warning device 20, a controller 30, and first to fifth temperature fuses 110 to 150. In this case, according to a scheme of implementing the apparatus 100 for detecting overheating of a battery module according to an embodiment of the present disclosure, each component may be combined with each other to be implemented together, and some components may be omitted.

Regarding each component, first, the storage 10 may store a reference table in which a reference resistance value is recorded corresponding to disconnection of at least one of the first to fifth temperature fuses 110 to 150. For example, the reference table is shown in following Table 1.

TABLE 1

| Disconnection location | R0 | R1 | R2 | R3 | R4 | Reference resistance value |
|---|---|---|---|---|---|---|
| case 1 | o | o | o | o | o | 0.0 |
| case 2 |   |   |   |   |   | 43.8 |
| case 3 |   |   |   |   | o | 48.0 |
| case 4 |   |   |   | o |   | 49.2 |
| case 5 |   |   | o |   |   | 51.3 |
| case 6 |   |   |   | o | o | 54.5 |
| case 7 |   | o |   |   |   | 56.1 |
| case 8 |   |   | o |   | o | 57.1 |
| case 9 |   |   | o | o |   | 58.8 |
| case 10 |   | o |   |   | o | 63.2 |
| case 11 |   | o |   | o |   | 65.2 |
| case 12 |   |   | o | o | o | 66.7 |
| case 13 |   | o | o |   |   | 69.0 |
| case 14 |   | o |   | o | o | 75.0 |
| case 15 | o |   |   |   |   | 77.9 |
| case 16 |   | o | o |   | o | 80.0 |
| case 17 |   | o | o | o |   | 83.3 |
| case 18 | o |   |   |   | o | 92.3 |
| case 19 |   | o | o | o | o | 100.0 |
| case 20 | o |   | o |   |   | 105.3 |
| case 21 | o |   |   | o | o | 120.0 |
| case 22 | o | o |   |   |   | 127.7 |
| case 23 | o |   | o |   | o | 133.3 |
| case 24 | o |   | o | o |   | 142.9 |
| case 25 | o |   |   | o | o | 142.9 |
| case 26 | o | o |   |   | o | 171.4 |
| case 27 | o | o |   | o |   | 187.5 |
| case 28 | o |   | o | o | o | 200.0 |
| case 29 | o | o | o |   |   | 222.2 |
| case 30 | o | o |   | o | o | 300.0 |
| case 31 | o | o | o |   | o | 400.0 |
| case 32 | o | o | o | o |   | 500.0 |

In Table 1, "o" represents a case where disconnection occurs. For example, the first temperature fuse 110 may have a resistance value R1 of 200Ω, the second temperature fuse 120 may have a resistance value R2 of 300Ω, the third temperature fuse 130 may have a resistance value R3 of 400Ω, the fourth temperature fuse 140 may have a resistance value R4 of 500Ω, and the fifth temperature fuse 150 may have a resistance value R0 of 100Ω.

For example, in case 7 where disconnection occurs in the first temperature fuse 110, the reference resistance value is 56.1Ω. Thus, when the measured resistance value of the entire temperature fuse satisfies 56.1Ω, the controller 30 may determine that overheating has occurred in the first temperature fuse 110.

As another example, in case 20 where disconnection occurred in the first to fourth temperature fuses 110 to 140, because any disconnection did not occur in the temperature fuse 150, when the measured total resistance value of the temperature fuses satisfies 105.3Ω, the controller 30 may determine that all the first to fourth temperature fuses 110 to 140 are overheated.

As another example, in case 1 where disconnection occurred in all the first to fifth temperature fuses 110 to 150, when the measured total resistance value of the temperature fuses satisfies 0Ω, considering that the fifth temperature fuse 150 is arranged spaced apart from a battery module, the controller 30 may determine that disconnection (or defective PCB connector connection) has occurred on the connection line with the controller 30.

Therefore, when the first to fourth temperature fuses 110 to 140 are all disconnected, the resistance value R0 of the fifth temperature fuse 150 may be used to detect whether disconnection was caused by overheating or disconnection on the connection line with the controller 30.

The storage 10 may store various logic, algorithms and programs required in the processes of measuring the total resistance value of the first to fourth temperature fuses 110 to 140 and an auxiliary temperature fuse 150 and detecting which temperature fuse is disconnected, that is, which battery module is overheated, based on the reference table.

The storage 10 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The warning device 20 may warn of the possibility of fire due to overheating of each battery module under control of the controller 30.

The warning device 20 may warn of the possibility of fire in at least one of visual warning, audible warning, or tactile warning. For example, the warning device 20 may visually warn of the possibility of fire through a display (not shown), may audibly warn of the possibility of fire through a speaker (not shown), and may tactilely warn of the possibility of fire through a vibration element (not shown). When an embodiment of the present disclosure is applied to an electric vehicle, a display, a speaker, and a vibration element provided in the electric vehicle may be used.

The controller 30 performs overall control so that each of the components can perform its function normally. The controller 30 may be implemented in the form of hardware or software, or may be implemented in the form of a combination of hardware and software. Preferably, the controller 30 may be implemented with a microprocessor, but is not limited thereto.

The processor may include a single processor core, or may include a plurality of processor cores. For example, the processor may include multi-cores such as dual-core, quad-core, and hexa-core. According to embodiments, the processor may further include a cache memory located inside or outside. According to embodiments, the processor may be configured with one or more processors. For example, the processor may include at least one of an application processor, a communication processor, or a graphical processing unit (GPU).

The processor may receive an instruction of other components, interpret the received instruction, and perform calculation or process data corresponding to the interpreted instruction. The processor may interpret and process messages, data, instructions, or signals received from the storage 10. The processor may generate a new message, data, instruction, or signal based on the received message, data, instruction, or signal. The processor may provide the storage 10 with processed or generated messages, data, instructions, or signals.

The processor may process data or signals generated or created in a program. For example, the processor may request instructions, data, or signals from the storage 10 to execute or control a program. The processor may record (or store) or update instructions, data, or signals to the storage 10 to execute or control a program.

The controller 30 may perform various control required in the processes of measuring the total resistance value of the first to fifth temperature fuses 110 to 150 connected in parallel with each other and detecting which temperature fuse is disconnected, that is, which battery module is overheated, based on the reference table.

Hereinafter, with reference to FIG. 2, the arrangement structure between each battery module 210 to 240 and each temperature fuse 110 to 150 will be described in detail.

FIG. 2 is a view illustrating a detailed structure of an apparatus for detecting overheating of a battery module according to an embodiment of the present disclosure.

As shown in FIG. 2, the first temperature fuse 110 may be arranged on the first battery module 210 and may be disconnected by overheating generated in the first battery module 210. In this case, the first temperature fuse 110 may be installed in a portion of the first battery module 210 where the highest heat is generated. When the first temperature fuse 110 is disconnected, the total resistance value R measured by the controller 30 may be expressed as following Equation 1.

$$R = \left\{ \dfrac{1}{\dfrac{1}{R0} + \dfrac{1}{R2} + \dfrac{1}{R3} + \dfrac{1}{R4}} \right\} \qquad \text{[Equation 1]}$$

Where R0 represents the resistance value of the fifth temperature fuse 150, R2 represents the resistance value of the second temperature fuse 120, R3 represents the resistance value of the third temperature fuse 130, and R4 represents the fourth temperature fuse 140.

The second temperature fuse 120 may be arranged on the second battery module 220 and may be disconnected by overheating caused in the second battery module 220. In this case, the second temperature fuse 120 may be installed in a portion of the second battery module 220 where the highest heat is generated. When the second temperature fuse 120 is disconnected, the total resistance value R measured by the controller 30 may be expressed as following Equation 2.

$$R = \left\{ \dfrac{1}{\dfrac{1}{R0} + \dfrac{1}{R1} + \dfrac{1}{R3} + \dfrac{1}{R4}} \right\} \qquad \text{[Equation 2]}$$

Where R1 represents the resistance value of the first temperature fuse 110.

The third temperature fuse 130 may be arranged on the third battery module 230 and may be disconnected by overheating caused in the third battery module 230. In this case, the third temperature fuse 130 may be installed in a portion of the third battery module 230 where the highest heat is generated. When the third temperature fuse 130 is disconnected, the total resistance value R measured by the controller 30 may be expressed as following Equation 3.

$$R = \left\{ \dfrac{1}{\dfrac{1}{R0} + \dfrac{1}{R1} + \dfrac{1}{R2} + \dfrac{1}{R4}} \right\} \qquad \text{[Equation 3]}$$

The fourth temperature fuse 140 is arranged on the fourth battery module 240 and may be disconnected by overheating caused in the fourth battery module 240. In this case, the fourth temperature fuse 140 may be installed in a portion of the fourth battery module 240 where the highest heat is generated. When the fourth temperature fuse 140 is disconnected, the total resistance value R measured by the controller 30 may be expressed as following Equation 4.

$$R = \left\{ \dfrac{1}{\dfrac{1}{R0} + \dfrac{1}{R1} + \dfrac{1}{R2} + \dfrac{1}{R3}} \right\} \qquad \text{[Equation 4]}$$

Because the fifth temperature fuse 150 is installed spaced apart from the battery module, it may be utilized to detect whether the disconnection of the first to fourth temperature fuses 110 to 140 was caused due to overheating of the battery modules or disconnection (or defective PCB connector connections) on a connection line 270.

The temperature fuses 110 to 150 include wires that are melted at or above a threshold temperature, so that melting may occur throughout the wires. As an example, the connection structure of each temperature fuse is shown in FIG. 3.

Meanwhile, the controller 30 may control the warning device 20 to warn of a possibility of fire when an overheated battery module is detected.

When the overheated battery module is detected, the controller 30 may turn off a relay (not shown) such that the power of a battery pack 310 is not supplied to the load. That is, the controller 30 may cut off the power of the battery pack 310.

FIG. 3 is a view illustrating a connection structure of a temperature fuse provided in an apparatus for detecting overheating of a battery module according to an embodiment of the present disclosure, where a temperature fuse having a wire shape is connected to each battery module provided in the battery pack 310.

FIG. 4 is a flowchart illustrating a method of detecting overheating of a battery module according to an embodiment of the present disclosure. Although the following description will be made based on the first and second temperature fuses 110 and 120 to help understanding, the same may be applied to the case where the third temperature fuse 130 and the fourth temperature fuse 140 are included.

First, in operation 401, the first temperature fuse 110 having the first resistance value is arranged on the first battery module 210 constituting the battery pack 310.

Then, in operation 402, the second temperature fuse 120 having the second resistance value is arranged on the second battery module 220 constituting the battery pack 310.

Then, in operation 403, the first and second temperature fuses 110 and 120 are connected in parallel with each other.

Thereafter, in operation 404, the controller 30 detects an overheated battery module based on the total resistance value of the first and second temperature fuses 110 and 120. That is, the controller 30 may store a reference table in which a reference resistance value is recorded corresponding to disconnection of the first or second temperature fuses 110 and 120, measure the total resistance value of the first and second temperature fuses 110 and 120, search the reference table for a temperature fuse in which disconnection has occurred, based on the measured total resistance value, and determine that a battery module corresponding to the searched temperature fuse is overheated.

FIG. 5 is a block diagram illustrating a computing system for executing a method of detecting overheating of a battery module according to an embodiment of the present disclosure.

Referring to FIG. 5, as described above, a method of detecting overheating of a battery module according to an embodiment of the present disclosure may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to embodiments of the present disclosure, there are provided an apparatus for detecting overheating of a battery module which includes the plurality of thermal fuses having different resistance values and can detect an overheated battery module based on a resistance value due to disconnection of at least one temperature fuse, and a method thereof, where one thermal fuse is arranged on one battery module constituting one battery pack, and the thermal fuses are connected in parallel with each other.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for detecting overheating of a battery module, the apparatus comprising:
a battery pack including a first battery module and a second battery module;
a first temperature fuse arranged on the first battery module and having a first resistance value;
a second temperature fuse arranged on the second battery module and having a second resistance value;
a third temperature fuse spaced apart from the first and second battery modules and having a third resistance value;
wherein the first, second, and third temperature fuses are connected to each other in parallel;
a storage configured to store a reference table in which a reference resistance value is recorded corresponding to disconnection of at least one of the first temperature fuse, second temperature fuse, or the third temperature fuse; and
a controller configured to:
detect an overheated battery module based on a total resistance value of the first, second, and third temperature fuses, and the reference table; and the reference table; and
determine that a defective connector connection has occurred on connection line between the first, second, and third temperature fuses and the controller when the total resistance value of the first, second, and third temperature fuses is 0Ω.

2. The apparatus of claim 1, wherein the controller is configured to measure the total resistance value of the first and second temperature fuses, search the reference table for a temperature fuse in which disconnection has occurred, based on the measured total resistance value, and determine that a battery module corresponding to the searched temperature fuse is overheated.

3. The apparatus of claim 1, wherein the controller is configured to warn of a possibility of fire when the overheated battery module is detected.

4. The apparatus of claim 1, wherein the controller is configured to cut off power of the battery pack when the overheated battery module is detected.

5. The apparatus of claim 1, wherein the first and second temperature fuses include wires that are melted at or above a threshold temperature, and wherein melting occurs throughout the wires.

6. The apparatus of claim 1, wherein the first temperature fuse is arranged in a portion of the first battery module where a highest heat is generated.

7. The apparatus of claim 1, wherein the second temperature fuse is arranged in a portion of the second battery module where a highest heat is generated.

* * * * *